United States Patent
Kwon

(10) Patent No.: US 7,681,024 B2
(45) Date of Patent: Mar. 16, 2010

(54) SECURE BOOTING APPARATUS AND METHOD

(75) Inventor: Moon-sang Kwon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 299 days.

(21) Appl. No.: 11/291,891

(22) Filed: Dec. 2, 2005

(65) Prior Publication Data

US 2006/0129791 A1 Jun. 15, 2006

(30) Foreign Application Priority Data

Dec. 9, 2004 (KR) ...................... 10-2004-0103562

(51) Int. Cl.
- *G06F 9/00* (2006.01)
- *G06F 9/24* (2006.01)
- *G06F 15/177* (2006.01)

(52) U.S. Cl. ......................................................... 713/1
(58) Field of Classification Search ................ 713/1
See application file for complete search history.

(56) References Cited

U.S. PATENT DOCUMENTS

| | | | |
|---|---|---|---|
| 5,826,007 A | 10/1998 | Sakaki et al. | |
| 5,892,902 A | 4/1999 | Clark | |
| 6,182,187 B1 | 1/2001 | Cox et al. | |
| 6,263,431 B1 * | 7/2001 | Lovelace et al. | 713/2 |
| 6,405,311 B1 * | 6/2002 | Broyles et al. | 713/2 |
| 6,625,729 B1 * | 9/2003 | Angelo et al. | 713/2 |
| 7,073,064 B1 * | 7/2006 | Angelo et al. | 713/176 |
| 2002/0144104 A1 | 10/2002 | Springfield et al. | |
| 2003/0229777 A1 | 12/2003 | Morais et al. | |

FOREIGN PATENT DOCUMENTS

| | | | |
|---|---|---|---|
| CN | 1162150 A | | 10/1997 |
| CN | 1235743 A | | 11/1999 |
| JP | 9325914 A | | 12/1997 |
| JP | 10-333902 A | | 12/1998 |
| JP | 10-333902 F1 | * | 12/1998 |
| JP | 10333902 A | | 12/1998 |
| JP | 2003229284 A | | 8/2003 |
| JP | 2004-139442 A | | 5/2004 |
| KR | 2003-0044901 A | | 6/2003 |
| WO | 98/10611 A2 | | 3/1998 |
| WO | 01/27770 A1 | | 4/2001 |

* cited by examiner

*Primary Examiner*—Thomas Lee
*Assistant Examiner*—Mohammed H Rehman
(74) *Attorney, Agent, or Firm*—Sughrue Mion, PLLC

(57) ABSTRACT

A secure booting apparatus and method, in which integrity can be guaranteed when booting with an operating system (OS). The secure booting apparatus includes an OS storing unit, a memory unit, and a control unit. The OS storing unit includes a first region that stores an OS and a second region that stores a check value of an algorithm, the check value corresponding to the OS. The OS is loaded into the memory unit when booting. The control unit calculates a check value based on the loaded OS using the algorithm used to calculate the check value stored in the second region and compares the calculated check value and the check value stored in the second region to determine the integrity of the OS.

14 Claims, 5 Drawing Sheets

SECURE BOOTING APPARATUS AND METHOD

CROSS-REFERENCE TO RELATED APPLICATION

This application claims priority from Korean Patent Application No. 10-2004-0103562 filed on Dec. 9, 2004, in the Korean Intellectual Property Office, the disclosure of which is incorporated herein by reference in its entirety.

BACKGROUND OF THE INVENTION

1. Field of the Invention

Apparatuses and methods consistent with the present invention relate to secure booting, and more particularly, to secure booting in which the integrity of an operating system (OS) can be guaranteed when booting with the OS.

2. Description of the Related Art

Embedded systems such as electronic appliances, communication devices, and set-top boxes generally use non-volatile storage devices as storage media for storing and processing data.

An embedded system stores an OS in a non-volatile storage device and is booted by the stored OS. The OS is generally stored in a non-volatile storage device in the form of an image.

When the embedded system is booted from the OS stored in the non-volatile storage device, there should be a way of guaranteeing that the OS has not changed. For example, when power is applied to a cellular phone and the cellular phone is then booted by an OS stored in an embedded non-volatile storage device, there should be a way of guaranteeing the integrity of the stored OS. If the integrity of an OS is not guaranteed and the OS has been changed by an external attacker during the booting of an embedded system, the embedded system will not operate normally.

Thus, various approaches for secure booting by guaranteeing the integrity of an OS of an embedded system have been suggested.

FIG. 1 is a block diagram of a secure booting apparatus allowing the secure booting of an embedded system according to the prior art.

The secure booting apparatus includes an OS storing unit 10, a memory unit 20, and a control unit 30. The OS storing unit 10 stores an OS and a check value of an algorithm, the check value corresponding to the OS. The OS stored in the OS storing unit 10 is loaded into the memory unit 20 when the embedded system is booted. The control unit 30 calculates a check value based on the loaded OS using the algorithm used to calculate the stored check value and determines the integrity of the loaded OS by comparing the stored check value and the calculated check value.

The OS storing unit 10 includes a non-volatile storage region to store the OS and check value even when the applied power is removed.

When booting is performed by the OS, the secure booting apparatus may further include a booting code storing unit 40 and a key storing unit 50. The booting code storing unit 40 stores a booting code including information about a booting process. The key storing unit 50 encrypts the OS and check value stored in the OS storing unit 10 and stores keys for the encrypted OS and check value. Since the booting code storing unit 40 is set as read only, the stored booting code cannot be changed from the outside. The check value calculation may use any algorithm that calculates a different check value if only a single bit of the OS is changed and no identical check value exists.

The key storing unit 50 generally includes a tamper resistance module (TRM) to protect against forgery and to protect a key stored therein from being externally accessed. The reason for this protection is that if the key stored in the key storing unit 50 is exposed to the outside, the OS and check value that are stored in the OS storing unit 10 after being encrypted are vulnerable to being tampered with. The key storing unit 50 may be embedded into or implemented separately from the control unit 30 that controls the overall booting process.

FIG. 2 is a flowchart illustrating a secure booting method according to the prior art.

Referring to FIG. 2, once the power is applied to the embedded system, the control unit 30 reads the booting code stored in the booting code storing unit 40 to initiate the booting process in operation S10.

The control unit 30 then loads the OS stored in the OS storing unit 10 into the memory unit 20 according to the read booting code in operation S20. At this time, the control unit 30 accesses the booting code stored in the booting code storing unit 40 and the OS loaded into the memory unit 20 from the OS storing unit 10 based on a predetermined mapping table.

The control unit 30 then decrypts the loaded OS using the key stored in the key storing unit 50 in operation S30.

The control unit 30 calculates a check value based on the decrypted OS using the algorithm used to calculate the check value stored in the OS storing unit 10 in operation S40.

The control unit 30 compares the calculated check value and the loaded and decrypted check value to determine the integrity of the OS stored in the OS storing unit 10 in operation S50.

If the calculated check value and the loaded check value are the same, the OS is determined as not having been changed and the booting process progresses normally in operation S60.

If the calculated check value and the loaded check value are different, it is determined that the OS is changed and its integrity is damaged, and thus, the booting process is stopped in operation S70.

The secure booting method according to the prior art uses a predetermined algorithm to determine whether the OS is changed. If the algorithm is known to the outside, there is a possibility that not only the OS but also the algorithm may be changed, resulting in damage to the integrity of the OS. Moreover, since the booting code storing unit 40 is set as read only to prevent a booting code from being changed from the outside if the booting code is exposed to the outside after mass production of an embedded system using the booting code, a large recall cost is required to change the exposed booting code.

Furthermore, a key is used to encrypt an OS and a check value, resulting in additional cost for configuring a TRM for storing the key. Like the booting code, when such a key is exposed to the outside, a large recall cost is required to change the exposed key.

Korean Patent Publication No. 2003-0074016 discloses a system driven using a NAND flash memory and a method for driving the system, in which a booting speed is improved by performing a multi-step booting operation through a single NAND interface. However, the foregoing technique has a problem in that it is difficult to guarantee the integrity of an OS when the system driven using the NAND flash memory is booted.

SUMMARY OF THE INVENTION

The present invention provides a secure booting apparatus and method, in which a configuration required to determine the integrity of an OS is simplified and secure booting is guaranteed.

The above stated objects as well as other objects, features and advantages, of the present invention will become clear to those skilled in the art upon review of the following description.

According to an exemplary embodiment of the present invention, there is provided a secure booting apparatus including an OS storing unit, a memory unit, and a control unit. The OS storing unit includes a first region that stores an OS and a second region that stores a check value of an algorithm, the check value corresponding to the OS. The OS is loaded into the memory unit when booting. The control unit calculates a check value based on the loaded OS using the algorithm used to calculate the check value stored in the second region and compares the calculated check value and the check value stored in the second region to determine the integrity of the OS.

According to another exemplary embodiment of the present invention, there is provided a secure booting method including loading an OS stored in a first region when booting, reading a check value of an algorithm, the check value corresponding to the OS from a second region when the OS is stored, and calculating the check value corresponding to the loaded OS using the algorithm used to calculate the check value read from the second region, and comparing the read check value and the calculated check value to determine the integrity of the OS.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS THE INVENTION

Figure 1:
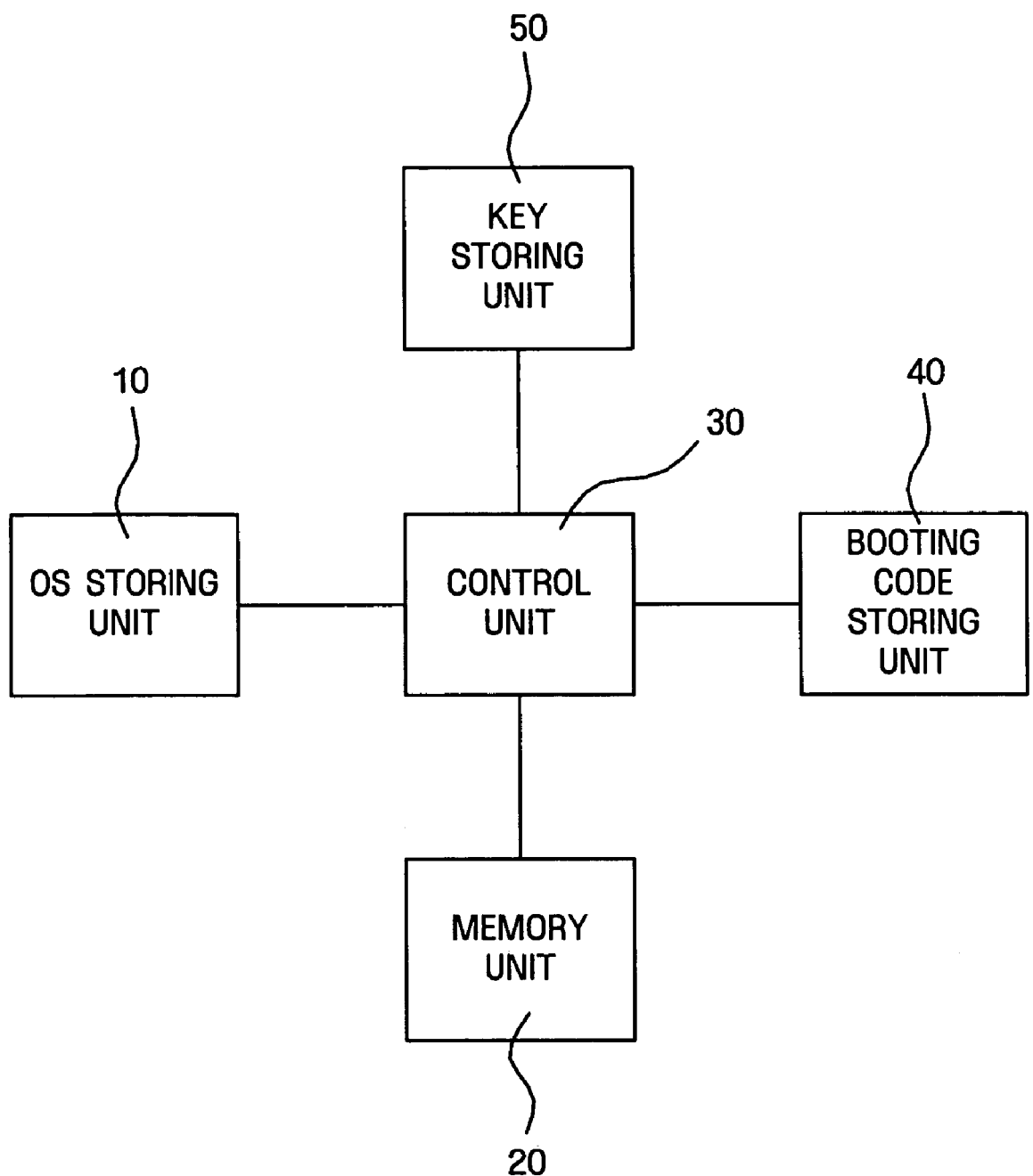
FIG. 1 is a block diagram of a secure booting apparatus allowing the secure booting of an embedded system according to the prior art.
Figure 2:
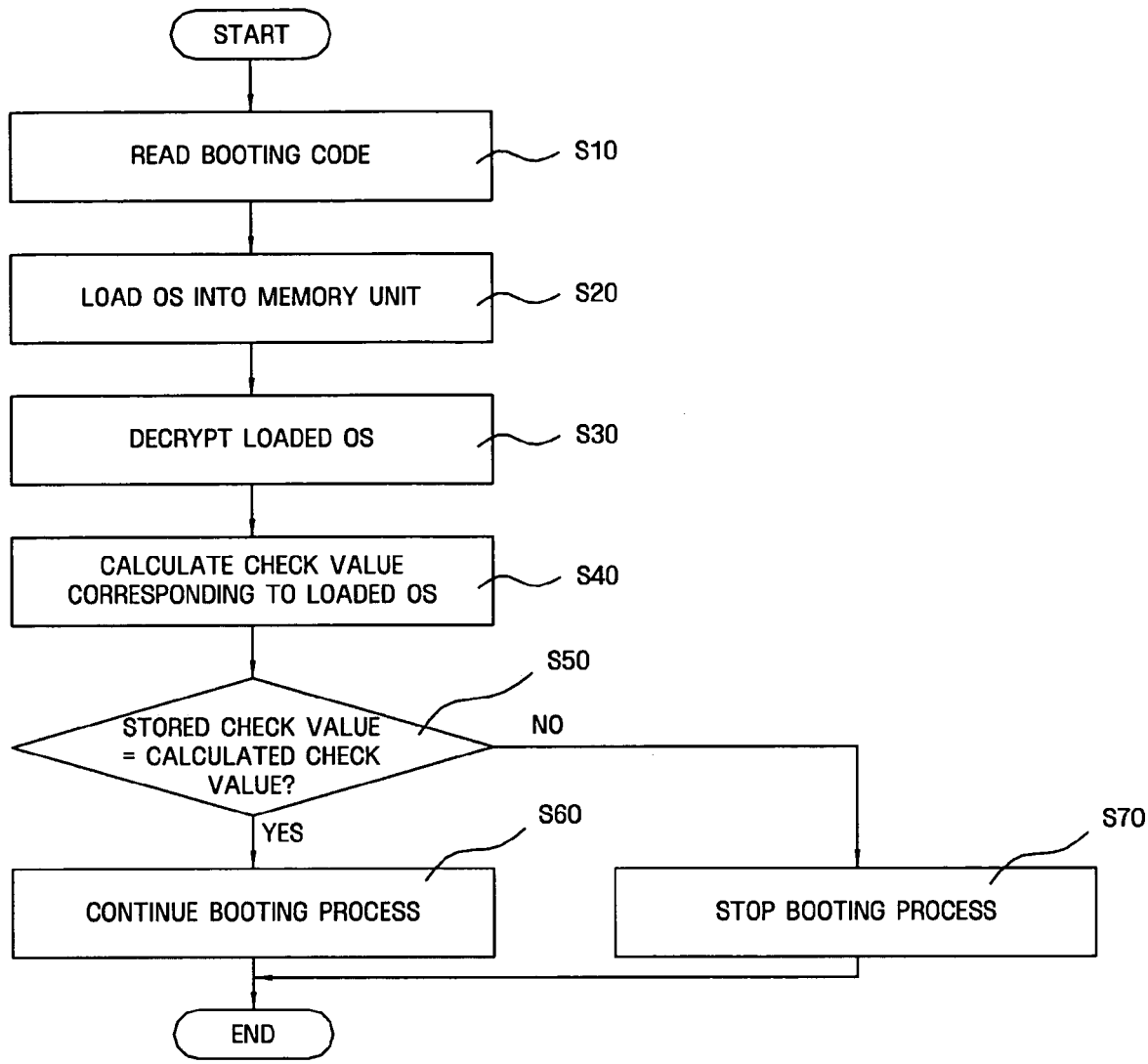
FIG. 2 is a flowchart illustrating a secure booting method according to the prior art.

The present invention will now be described more fully with reference to the accompanying drawings, in which exemplary embodiments of this invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 3:
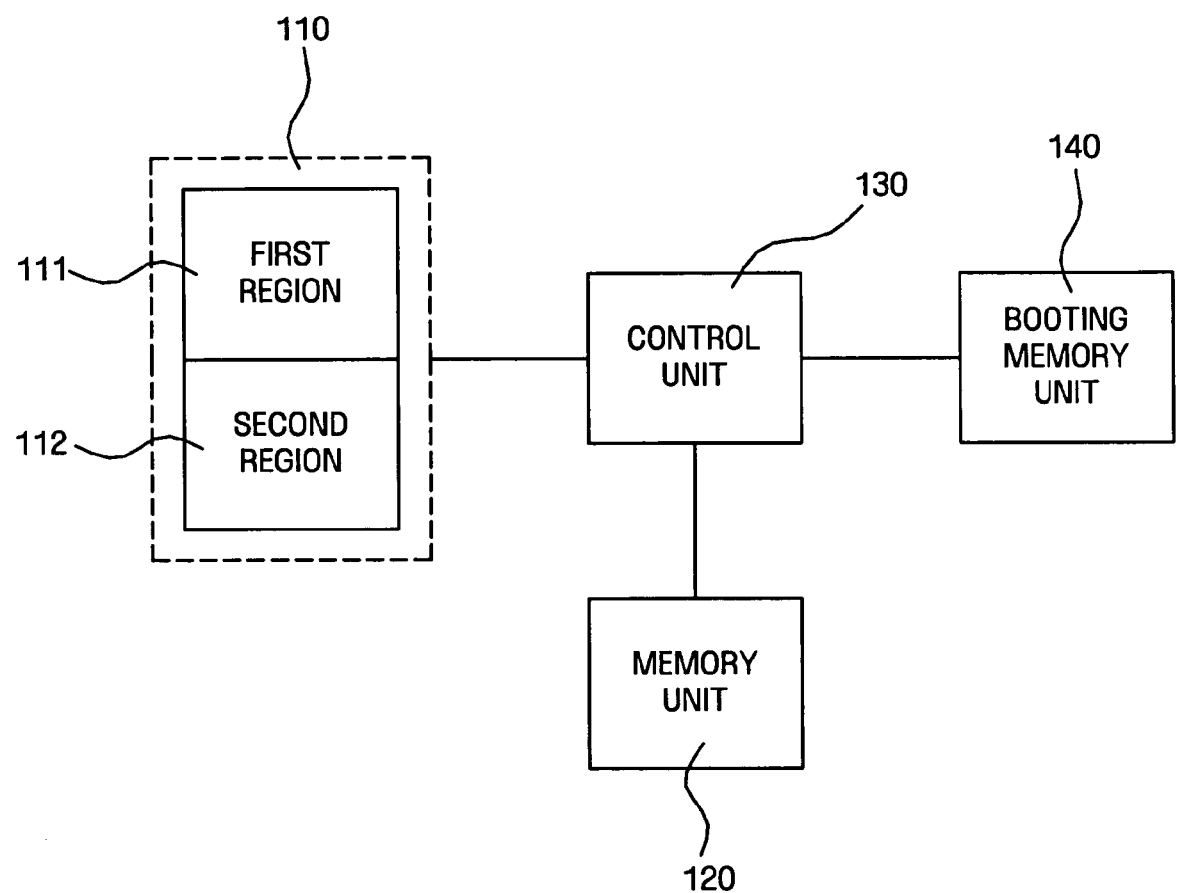
FIG. 3 is a block diagram of a secure booting apparatus according to an exemplary embodiment of the present invention.

FIG. 3 is a block diagram of a secure booting apparatus according to an exemplary embodiment of the present invention.

Referring to FIG. 3, a secure booting apparatus 100 includes an OS storing unit 110, a memory unit 120, and a control unit 130. The OS storing unit 110 includes a first region 111 for storing an OS and a second region 112 for storing a check value of an algorithm, the check value corresponding to the OS. The OS stored in the first region 111 is loaded into the memory unit 120 when booting. The control unit 130 calculates a check value based on the loaded OS using the algorithm stored in the second region 112 and compares the calculated check value and the check value stored in the second region 112 to determine the integrity of the loaded OS. The check value of the algorithm corresponds to the OS and may be used to determine the integrity of the OS when booting is performed using the OS.

Here, the OS stored in the first region 111 may be stored after being compressed or encrypted, and thus, is decompressed or decrypted before being loaded into the memory unit 120.

The second region 112 may store a booting code including information about a booting process, when booting is performed by the secure booting apparatus 100 according to an exemplary embodiment of the present invention. The OS storing unit 110 includes a non-volatile storage region to keep information stored in the first region 111 and the second region 112 even when the power supply is interrupted. Although the first region 111 and the second region 112 are integrated in a single hardware unit in an exemplary embodiment of the present invention, the first region 111 and the second region 112 may also be implemented as separate hardware units. The secure booting apparatus 100 according to an exemplary embodiment of the present invention may further include a booting memory unit 140 into which the booting code stored in the second region 112 is loaded to allow booting to be performed based on the loaded booting code, when the power is applied. Once the booting code is loaded, the booting memory unit 140 may be changed into a read-only region to prevent the loaded booting code from being changed. The booting memory unit 140 maintains a read-only state until the applied power is removed. The control unit 130 proceeds with the booting process using the booting code loaded into the booting memory unit 140.

While the booting code is stored in the second region 112 according to an exemplary embodiment of the present invention, it may be stored in the first region 111 or an additional memory set as read only. The booting code may be loaded into the booting memory unit 140 using an automatically executed code that causes the booting code to be automatically loaded into the booting memory unit 140 when the power is applied to the secure booting apparatus 100 according to an exemplary embodiment of the present invention.

If the size of the booting code exceeds the size of the booting memory unit 140 and thus the booting code cannot be entirely stored, the remaining portion of the booting code that does not fit in the booting memory unit 140 may be stored in the memory unit 120 and control of the remaining portion may be performed in a booting code region of the memory unit 120.

The booting memory unit 140 and the OS storing unit 110 are implemented as separate units according to an exemplary embodiment of the present invention, but may be integrated into a single unit.

More specifically, a register may be embedded into a non-volatile storage device such as a flash memory to load a boot handler code and a boot strap loader code when booting is performed using the non-volatile storage device. Thus, when booting is performed using the OS storing unit 110, the booting memory unit 140 may be embedded into the OS storing unit 110.

In addition, when booting is performed using the OS storing unit 110, a separate controller may be embedded into the OS storing unit 110 for data processing between the OS storing unit 110 and a host device connected to the OS storing unit 110. When booting is performed using the OS storing unit 110, the memory unit 120, the control unit 130, and the booting memory device 140 according to an exemplary embodiment of the present invention may be understood as being components of a host device connected to the OS storing unit 110.

The second region 112 of the OS storing unit 110 may be set as a general non-volatile storage region or set so that it cannot be changed any more during a data-recording operation. For example, if the second region 112 can be recorded to only once, it may be called a one-time programmable (OTP) region. Data recording in the second region 112 of the OS storing unit 110 may be disabled by applying a voltage that is higher than a preset threshold voltage to a write logic. Thus, after a check value and a booting code are recorded in the second region 112, the second region 112 may be set as a read-only region by disenabling data recording by applying a voltage that is higher than a preset threshold voltage.

The second region 112 is changed into a read-only region because it is difficult to entirely guarantee the integrity of the OS stored in the first region 111 when the check value and the booting code used in an exemplary embodiment of the present invention are changed. Thus, by setting the second region 112 as a one-time recordable region, it is possible to prevent the check value and the booting code from being changed from the outside.

To determine the integrity of the OS stored in the first region 111, the check value stored in the second region 112 and the check value calculated using the algorithm (e.g., a one-way hash algorithm) used to calculate the stored check value based on the stored OS are compared to determine the integrity of the stored algorithm. In an exemplary embodiment of the present invention, the algorithm may be stored in the OS storing unit 110 or in an additional memory. The algorithm used in an exemplary embodiment of the present invention has a predetermined unique check value corresponding to an OS.

The algorithm used in an exemplary embodiment has a predetermined unique check value corresponding to an OS because when the check value stored in the second region 112 is changed, it may be determined that the stored OS is not changed even if the stored OS has actually been tampered with, resulting in an abnormal operation of the secure booting apparatus 100. Consequently, after storing the check value and the booting code in the second region 112, the control unit 130 sets the second region 112 as a read-only region. The control unit 130 may access the memory unit 120 and the booting memory unit 140 based on a predetermined mapping table. Examples of the memory unit 120 and the booting memory unit 140 include, but are not limited thereto, a cache memory, a read-only memory (ROM), a programmable ROM (PROM), an erasable PROM (EPROM), an electrically EPROM (EEPROM), a flash memory, a static random access memory (SRAM), and a dynamic random access memory (DRAM).

In this exemplary embodiment, when the secure booting apparatus 100 is booted, the control unit 130 may determine the integrity of the loaded OS.

More specifically, the control unit 130 compares a check value calculated based on the loaded OS and the check value stored in the second region 112. If the calculated check value and the stored check value are the same, the control unit 130 determines the integrity of the loaded OS to be flawless and proceeds with a normal booting process. If the calculated check value and the stored check value are different, the control unit 130 determines the integrity of the loaded OS to be damaged and stops the booting process.

Hereinafter, a secure booting method according to an exemplary embodiment of the present invention, which is capable of guaranteeing integrity using the secure booting apparatus 100, will be described.

Figure 4:
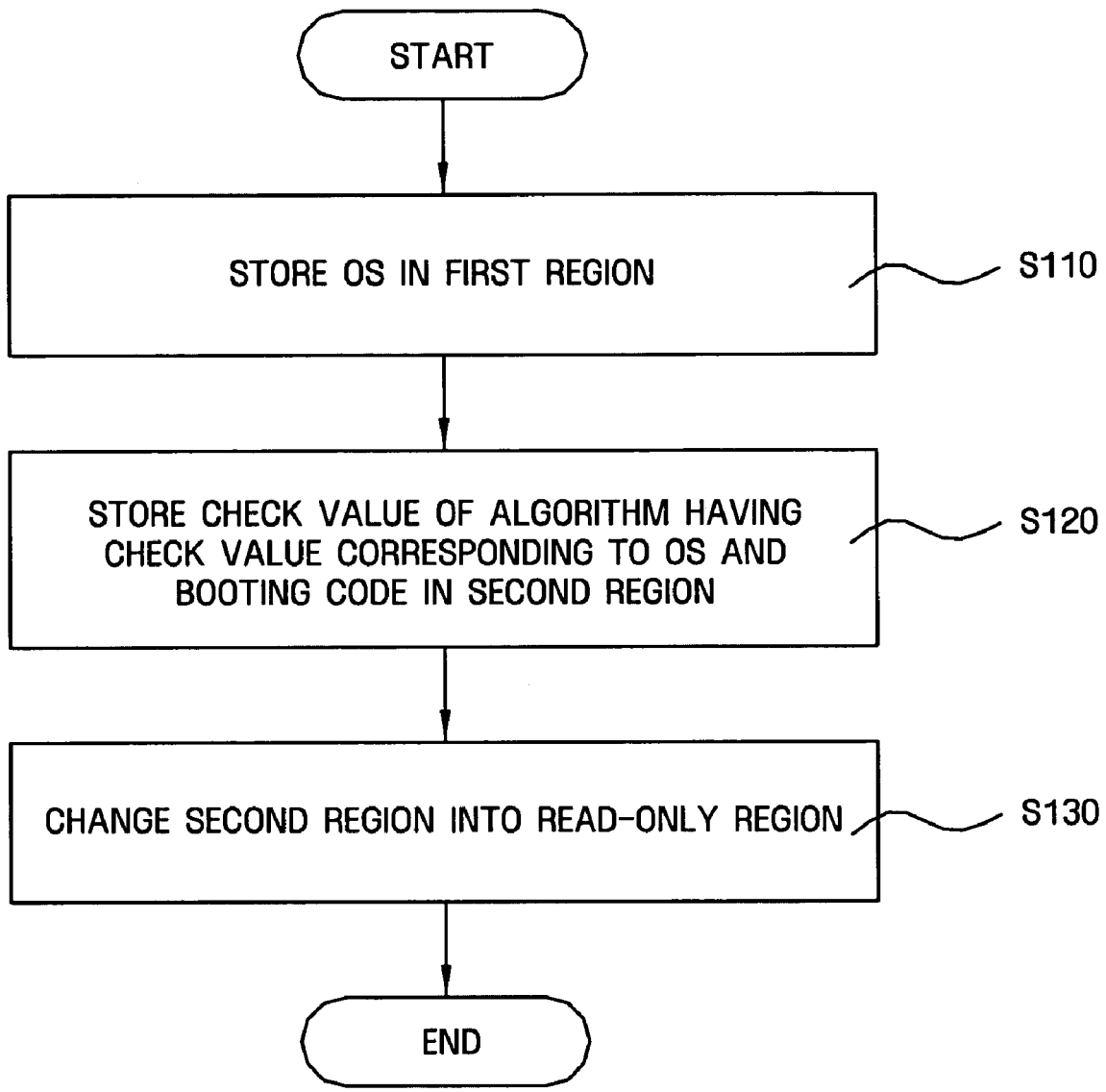
FIG. 4 is a flowchart illustrating a process of storing an OS according to an exemplary embodiment of the present invention.

FIG. 4 is a flowchart illustrating a process of storing an OS and storing a check value and a booting code that are used to determine the integrity of the stored OS according to an exemplary embodiment of the present invention.

Referring to FIG. 4, a predetermined OS is stored in the first region 111 of the OS storing unit 110 in operation S110. The stored OS may be stored after being compressed or encrypted.

Next, a check value of an algorithm, the check value corresponding to the stored OS, and a booting code including information about a booting process are stored in the second region 112 in operation S120. The algorithm has the unique check value corresponding to the OS, and any algorithm that generates a different check value if only a single bit of the OS is changed can be used.

Since the second region 112 is a one-time recordable region, the second region 112 is changed into a read-only region in operation S130 after the check value and the booting code are stored in the second region 112. The second region 112 may be changed into a read-only region by disenabling the write logic of the second region 112.

Figure 5:
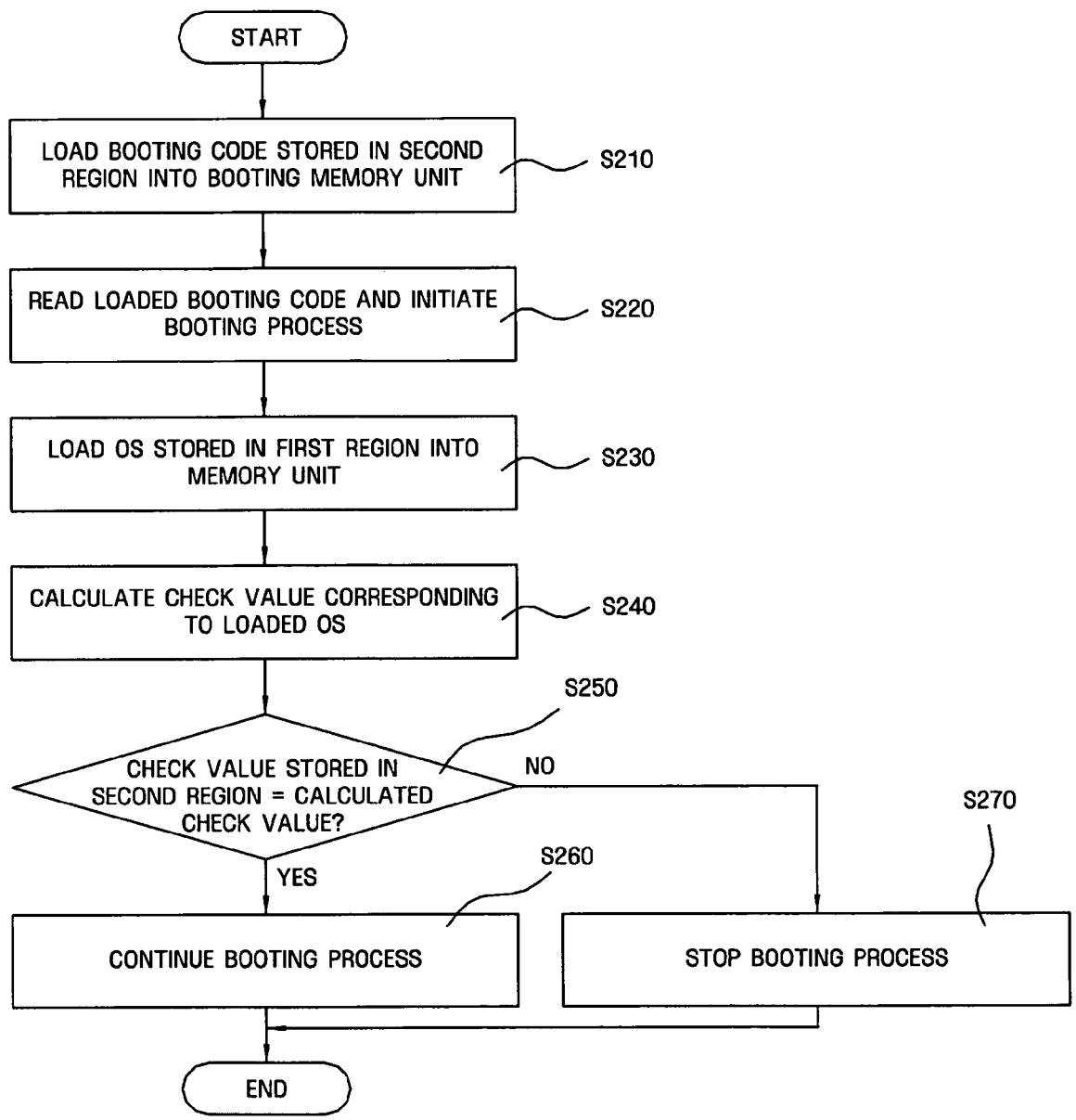
FIG. 5 is a flowchart illustrating a secure booting method according to an exemplary embodiment of the present invention.

FIG. 5 is a flowchart illustrating a secure booting method using the OS (stored by the method shown in FIG. 4), the check value, and booting code.

Referring to FIG. 5, once the power is applied to the secure booting apparatus 100 according to an exemplary embodiment of the present invention, the booting code stored in the second region 112 is loaded into the booting memory unit 140 in operation S210. Once the booting code is loaded into the booting memory unit 140, the booting memory unit 140 is changed into a read-only region and maintains a read-only state until the applied power is removed, thereby preventing the loaded booting code from being changed. The booting code stored in the second region 112 may be automatically loaded into the booting memory unit 140 when the power is applied by an embedded, automatically executed code.

The control unit 130 reads the loaded booting code to initiate the booting process in operation S220.

Once the booting process is initiated, the storing unit 110, the memory unit 120, the control unit 130, and the booting memory unit 140 of the secure booting apparatus 100 are initialized and then become available and the OS stored in the first region 111 is loaded into the memory unit 120 in operation S230. If the stored OS is compressed or encrypted, it may be decompressed or decrypted before it is loaded into the memory unit 120.

Next, the control unit 130 calculates a check value based on the loaded OS using the algorithm used to calculate the check value stored in the second region 112, in operation S240.

The control unit 130 compares the calculated check value and the check value stored in the second region 112 to determine the integrity of the loaded OS in operation S250.

If the calculated check value and the stored check value are the same, the control unit 130 determines that the loaded OS has not changed and its integrity is guaranteed, and thus proceeds with the booting process in operation S260.

If the calculated check value and the stored check value are different, the control unit 130 determines that the loaded OS has changed and its integrity is damaged, and thus stops the booting process in operation S270.

As such, in the secure booting method according to an exemplary embodiment of the present invention, the integrity of an OS is secured only using a non-volatile storage region without separately using a region adopting a forgery protection technique such as a conventional TRM, thereby making secure booting possible.

As described above, while a secure booting apparatus and method according to the present invention have been described in connection with an exemplary embodiment of the present invention, it will be apparent to those skilled in the art that various modifications and changes may be made thereto without departing from the scope and spirit of the invention.

As described above, according to the present invention, the following effects can be achieved.

First, the integrity of an OS can be easily guaranteed without using a region for storing a key used to encrypt the OS and information related thereto to guarantee the integrity of the OS.

Second, after an algorithm for guaranteeing the integrity of an OS and a check value of the algorithm are stored in a region, the region is changed into a read-only region, thereby preventing the algorithm and the check value from being changed even when the algorithm and the check value are exposed. Consequently, a mass of recalls is prevented.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. A booting apparatus comprising:
   an operating system (OS) storing unit comprising a first region that stores an OS and a second region that stores a first check value calculated using a one-way hash algorithm having the stored OS as an input and a booting code comprising information about a booting process, wherein the check value corresponds to the OS and is not encrypted;
   a memory unit into which the OS is loaded when booting; and
   a control unit which calculates a second check value using the one-way hash algorithm having the loaded OS as an input and compares the second check value to the first check value stored in the second region to determine an integrity of the OS.

2. The booting apparatus of claim 1, wherein the OS storing unit comprises a non-volatile storage region, and the first and second regions are included in the non-volatile storage region.

3. The booting apparatus of claim 2, wherein the second region is a one-time recordable region and is changed into a read-only region after storing the first check value.

4. The booting apparatus of claim 3, further comprising a booting memory unit into which the booting code is loaded.

5. The booting apparatus of claim 4, wherein once the booting code is loaded into the booting memory unit, the booting memory unit is changed into a read-only region.

6. The booting apparatus of claim 3, wherein the second region remains read-only until power to the second region is removed.

7. The booting apparatus of claim 1, wherein the first check value only is stored in the OS storing unit and the second check value is not stored in any region.

8. A booting method comprising:
   loading an operating system (OS) stored in a first region of an OS storing unit when booting;
   reading a first check value calculated using a one-way hash algorithm having the stored OS as an input, wherein the first check value corresponds to the OS stored in a second region of the OS storing unit and is not encrypted; and
   calculating a second check value using the one-way hash algorithm having the loaded OS as an input; and
   comparing the first check value stored in a second region of the OS storing unit to the second check value to determine an integrity of the OS,
   wherein the second region stores a booting code including information about a booting process.

9. The booting method of claim 8, wherein the first region and the second region are non-volatile storage regions.

10. The booting method of claim 9, wherein the second region is a one-time recordable region and is changed into a read-only region when the first check value is stored.

11. The booting method of claim 10, wherein the second region remains read-only until power to the second region is removed.

12. The booting method of claim 9, wherein the booting code is recorded together with the first check value.

13. The booting method of claim 12, wherein the booting code is loaded into a predetermined booting memory unit when booting and the booting memory unit is changed into a read-only region after the booting code is loaded.

14. The booting method of claim 8, wherein the first check value only is stored in the OS storing unit and the second check value is not stored in any region.

* * * * *